United States Patent [19]

Sinclair et al.

[11] 3,857,031

[45] Dec. 24, 1974

[54] AUTOMATIC FOCUS CONTROL FOR FACSIMILE CAMERAS

[75] Inventors: Archibald R. Sinclair, Hampton; Ernest E. Burcher, Newport News; Stephen J. Katzberg, Yorktown, all of Va.

[73] Assignee: The United States of America as represented by the Administrator of the National Aeronautics and Space Administration, Washington, D.C.

[22] Filed: Oct. 15, 1973

[21] Appl. No.: 406,715

[52] U.S. Cl. .................................... 250/201, 356/4

[51] Int. Cl. .............................................. G01j 1/20

[58] Field of Search ........ 250/201, 206, 216; 356/4, 356/5, 120; 95/44 C, 45; 178/7.6

[56] References Cited

UNITED STATES PATENTS

| | | | |
|---|---|---|---|
| 3,333,105 | 7/1967 | Kossakowski | 356/4 |
| 3,418,478 | 12/1968 | Falbel | 250/201 |
| 3,589,815 | 6/1971 | Hosterman | 356/120 |
| 3,719,421 | 3/1973 | Poilleux | 250/201 |
| 3,723,003 | 3/1973 | Vockenhuber | 95/44 C |
| 3,765,765 | 10/1973 | Hefter | 250/201 |

*Primary Examiner*—James W. Lawrence
*Assistant Examiner*—D. C. Nelms
*Attorney, Agent, or Firm*—William H. King; Howard J. Osborn; John R. Manning

[57] ABSTRACT

A movable stage contains two photodetectors for focusing, as well as an imaging sensor. The imaging sensor produces the video data in the fashion standard to facsimile cameras. The two photodetectors are placed with one closer to the lens of the facsimile camera than the imaging sensor and with the other farther away. The movable stage is coupled to a linear motor which is driven from an error signal generated by the electronics. The electronics consists of balanced a.c. amplifiers, two square law function generators, and a differential amplifier and power drive. In order to insure that the electrical signals at the output of the two photodetectors and the imaging sensor are in phase, electrical delays are connected to the outputs of the two photodetectors. The invention also includes means for maintaining the imaging sensor at the expected location of the focal plane as the facsimile camera scans a scene or terrain. In a second embodiment of the invention, a 3-faced mirror is used to insure that all three of the detectors are detecting the same picture elements simultaneously thereby eliminating the need for the two electrical dalays at the outputs of the two photoconductors.

6 Claims, 2 Drawing Figures

AUTOMATIC FOCUS CONTROL FOR FACSIMILE CAMERAS

ORIGIN OF THE INVENTION

The invention described herein was made by employees of the U.S. Government and may be manufactured and used by or for the Government for governmental purposes without the payment of any royalties thereon or therefor.

BACKGROUND OF THE INVENTION

The invention relates generally to facsimile cameras and more specifically concerns an automatic focus control for facsimile cameras.

All imaging devices such as the facsimile camera suffer from depth of focus limitations when attempting to image scenes. That is, it is impossible to simultaneously have all portions of a scene in perfect focus at the same time at one focus position. However, since the facsimile camera images a scene by scanning discrete strips, it becomes possible to have the entire scene in focus at the point of imaging. It is the purpose of this invention to perform the function of automatically focusing the facsimile camera throughout the object field being scanned. This invention does this by determining the correct focus point for objects as they are scanned and adjusting the focus of the imaging sensor accordingly. Thus, the facsimile camera is made capable of imaging a three-dimensional scene in perfect focus by this invention.

SUMMARY OF THE INVENTION

The invention relates to an automatic focus control for a facsimile camera. The imaging detector of the camera and first and second photodetectors are mounted on a movable stage in a linear array along the direction of scan of the camera with the first photodetector mounted closer to the camera lens and with the second photodetector mounted farther from the camera lens than the imaging detector. A first electrical delay is connected to the output of the first photodetector for delaying its signals a period of time equal to the time that it takes the scanning means of the camera to scan from the first photodetector to the imaging detector. A second electrical delay is connected to the output of the second photodetector for delaying its signals a period of time equal to the time that it takes the scanning means to scan from the second photodetector to the imaging detector. A servo means is connected to receive the outputs of the first and second electrical delays for moving said movable means along a line in the direction of the lens of the camera so as to maintain the outputs of the electrical delays equal. Consequently, the facsimile camera remains in focus at all times. In addition, means are provided for maintaining the imaging detector at the predicted location of the focal plane as the camera scans a terrain. In a second embodiment of the invention, a three-faced mirror is used such that the imaging detector and the first and second photodetectors synchronously detect the same picture elements. Hence, the electrical delay means at the outputs of the first and second photodetectors are not needed to keep all three of the electrical signals in phase.

DETAILED DESCRIPTION OF THE INVENTION

Figure 1:
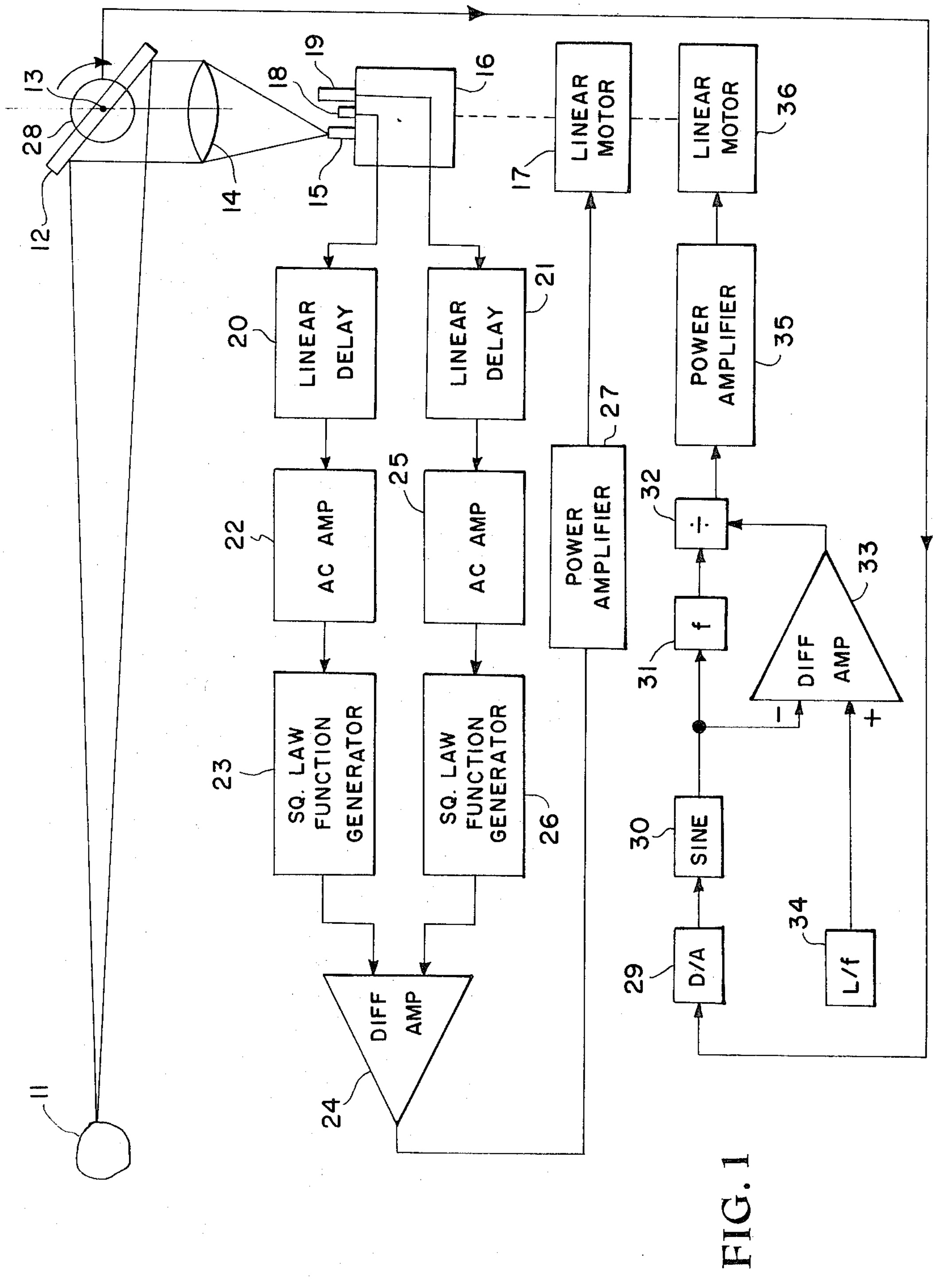
FIG. 1 is a block diagram of an embodiment of the invention.

Turning now to the embodiment of the invention selected for illustration in the drawings, the number 11 in FIG. 1 designates an object that is being scanned by a facsimile camera. The facsimile camera which includes a scanning mirror 12, a lens 14 and an imaging detector 15 operates in the following manner. As mirror 12 rotates about an axis 13 in a clockwise direction, the mirror scans the object 11 and reflects the image of the scan through the lens 14 onto the focal plane of the camera. The imaging detector 15 which is on the focal plane of the camera is scanned from right to left by the image thereby producing electrical signals representing the object 11.

Imaging detector 15, in accordance with this invention, is attached to a movable stage 16 that is coupled to a linear motor 17 that can move the movable stage 16 either closer to or farther away from lens 14. A first photodetector 18 is attached to movable stage 16 farther away from lens 14 than imaging detector 15 and in line with the scan of the facsimile camera. Also attached to movable stage 16 nearer to the lens than the imaging sensor 15, is a second photodetector 19 which is also in line with the scan of the facsimile camera. Photo sensors 15, 18 and 19 may be any light detectors, for example, silicon or germanium photo diodes or photo transistors or cadmium sulfide or cadmium sulfide-type photoconductors would, among others, be equally utilizable. Inasmuch as the outputs from imaging detector 15 and photodetectors 18 and 19 do not simultaneously represent the same picture elements, linear delays 20 and 21 are connected to the outputs of photodetectors 18 and 19, respectively. Linear delay 20 delays the output of photodetector 18 a period of time equal to the time that it takes the scanning means to scan from photodetector 18 to imaging detector 15; and a linear delay 21 delays the output of photodetector 19 a period of time equal to the time that it takes the scanning means to scan from photodetector 19 to imaging detector 15. Consequently, the signals at the output of imaging detector 15 and linear delays 20 and 21 simultaneously represent the same picture elements. The output from linear delay is amplified by an a.c. amplifier 22 and applied through a square low function generator 23 to a differential amplifier 24. The output of linear delay 21 is amplified by an a.c. amplifier 25 and applied through a square law function generator 26 to differential amplifier 24. The error signal at the output of differential amplifier 24 is amplified by a power amplifier 27 and then applied to linear motor 17. Linear motor 17 positions movable stage 16 such that the error signal is maintained at zero thereby insuring that the facsimile camera is in perfect focus.

The remaining circuitry in FIG. 1 is a fail-safe circuit for the purpose of tracking a flat terrain. That is, the circuitry is for maintaining the imaging detector 15 in the expected focal plane of the camera as the camera scans a flat terrain. It can be shown that to maintain the imaging sensor 15 in the expected focal plane, it is necessary that movable means 16 move a distance X from its relaxed position $f$ such that $X = f \sin \theta / L/f - \sin \theta$ where $\theta$ is the angle that the line of scan of the scanning means makes with the flat terrain, $f$ is the focal length of the lens 14 and L is the distance that the facsimile camera is above the flat terrain. A digital shaft encoder 28 is connected to shaft 13 to produce a digital output that is proportional to the angle $\theta$. This digital signal is converted to an analog signal by a digital-to-analog converter 29 and then applied to a sine generator 30. The output of sine generator 30 is multiplied by $f$ by means of a multiplier 31 and then applied to the dividend input of a divider 32. The output of the sine generator 30 is also applied to the negative input of a differential amplifier 33. A potentiometer 34 produces $L/f$ which is applied to the positive input of differential amplifier 33, the output of which is connected to the divisor input of divider 32. The output of divider 32 is amplified by power amplifier 25 and applied to a linear motor 36. Linear motor 36 is coupled to linear motor 17 and movable stages 16 to move them along a line in the direction of lens 14.

In the operation of this invention the facsimile camera begins the scanning of a line in the object field which can consist of any three-dimensional scene of interest. Photodetector 18 receives light energy from a point slightly behind the imaging detector 15 and photodetector 19 receives light energy from a point slightly ahead of imaging detector 15. There are two possibilities: (1) if both photodetectors are equally out-of-focus, they receive equal signals or (2) if not, they receive different signals of which the photodetector in best focus shows the most alternating current components. The last is so because the in-focus condition will represent highest scene contrast, and it is this which causes the a.c. component in the light sensors when the scene moves past. The signals from the photodetectors are delayed by linear delays 20 and 21 to bring the outputs of the two photodetectors in phase with the output of imaging sensor 15. The signal at the output of each of the two linear delays is passed through its corresponding a.c. amplifier and square law function generator. The resulting squared signals are applied to a differential amplifier 24 which favors one polarity or the other depending on which photodetector is in best focus. The difference output of differential amplifier 24 drives the input of the power amplifier 27 and linear motor 17. Since this is basically a servomechanical closed-loop system in which the control input is zero, the equilibrium condition of the servo is for zero feedback signal (coming from the difference between the processed photodetector signals). That is, the servo drives the linear motor in position until there is equal signal from each photodetector. The imaging sensor 15 which is mounted on the movable stage 16 and at the calculated focus point between the two photodetectors is then in correct focus.

The fail-safe circuit is included in this invention for the following reasons. Equal signals from the photodetectors 18 and 19, when processed and subtracted, yield a zero error signal which indicates a focus condition. However, zero or d.c. signal from each photodetector yields the same result. This can happen when the facsimile camera is looking at a blank wall or shadow, for example. This condition is one in which focus control is impossible but in which fail-safe circuit is included to prevent excessive excursions by linear motor 17 when true video is re-acquired. This is done by adding the second linear motor 36 on which is mounted linear motor 17 and movable stage 16. The fail-safe circuit controls the equilibrium position of the main focus correction system, but does not interfere with dynamic operation. The input to the fail-safe circuit can be any predetermined signal, but one which tracks the in-focus distance of the perfect lens equation is used here. The assumption is made that the facsimile camera is scanning a flat plane or terrain on which it is perpendicularly situated. Position information from the facsimile camera vertical control is processed through function generators to yield the predicted in-focus distance behind the lens 14. This in no way inhibits the operation of the primary system and merely acts as a backup in the case of viewing blank or featureless objects in the image field. Thus, without any dynamic focus signals, the fail-safe merely tracks where the expected focus point would be until the photodetectors detect true video and make the appropriate corrections.

Figure 2:
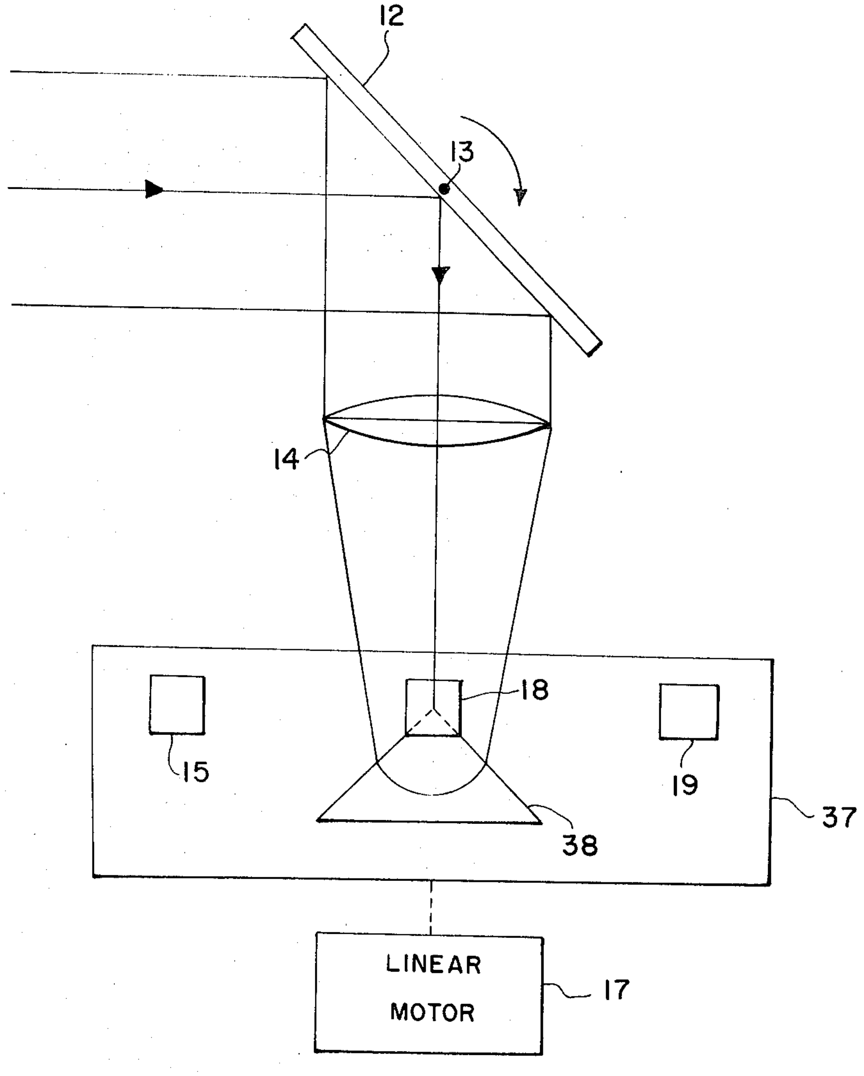
FIG. 2 is a modification of the embodiment of the invention disclosed in FIG. 1.

An alternate embodiment of the movable stage 16 in FIG. 1 is shown schematically in FIG. 2. In this embodiment, linear motor 17 is coupled to a movable stage 37. Mounted on movable stage 37 are photodetectors 18 and 19, imaging detector 15 and a three-faced mirror 38. The three sides of the mirror 38 supply images of the object scanned by the facsimile camera to the imaging detector 15, the photodetector 18 and the photodetector 19, respectively. The length of the light path from lens 14 to photodetector 18 is slightly greater than the length of light path from lens 14 to imaging detector 15 and the length of the light path from lens 14 to photodetector 19 is slightly less than the length of the light path from lens 14 to the imaging detector. In the operation of this embodiment of the invention, when imaging detector 15 is out of focus, photodetectors 18 and 19 produce an error signal which drives linear motor 17 to reduce the error signal to zero thereby bringing imaging detector 15 back into focus. The primary advantage that this embodiment of the invention has over the embodiment in FIG. 1 is that all three of the detectors produce electrical signals that simultaneously represent the same picture elements thereby eliminating the need for the linear delays 20 and 21.

The advantage of this invention is that it performs automatic focusing of a facsimile camera within a scan line thereby bringing the entire scene into correct focus.

What is claimed is:

1. An automatic focus control for a facsimile camera that includes a scanning means, a lens, a focal plane and an imaging detector for producing electrical signals of the picture elements viewed by the imaging detector comprising:

a movable stage with the imaging detector of said facsimile camera mounted thereon in the focal plane of said facsimile camera;

means including a first photodetector mounted on said movable stage closer to said lens than said imaging detector for producing first electrical signals of the picture elements viewed by the imaging detector and in phase with the electrical signals produced by the imaging detector;

means including a second photodetector mounted on said movable stage farther from said lens than said imaging detector for producing second electrical signals of the picture elements viewed by the imaging detector and in phase with the electrical signals produced by the imaging detector; and servo means receiving said first and second electrical signals for moving said movable means along a line in the direction of the lens of said facsimile camera so as to maintain said first and second electrical signals equal.

2. An automatic focus control for a facsimile camera according to claim 1 wherein said means for producing first electrical signals includes said first detector being mounted on said movable means in line with said imaging detector such that the photodetector is in the line of scan of scanning means of the facsimile camera and first electrical delay means connected to the output of said first photodetector for delaying the electrical signals produced by said first photodetector a period of time equal to the period of time it takes the scanning means to scan from the first photodetector to said imaging detector and wherein said means for producing second electrical signals includes said second photodetector being mounted on said movable means in lines with the imaging detector such that the photodetector is on the line of scan of the scanning means of the facsimile camera and second electrical delay means connected to the output of said photodetector for delaying the electrical signals produced by said second photodetector a period of time equal to the period of time it takes said scanning means to scan from said second photodetector to said imaging detector.

3. An automatic focus control for a facsimile camera according to claim 1 wherein said means for producing said first and second electrical signals includes optical means for dividing the light from the scanning means into first, second and third parts and for directing them to said first photodetector, said second photodetector and said imaging detector, respectively, thereby assuring that said first and second electrical signals are in phase with the electrical signals produced by said imaging detector.

4. An automatic focus control for a facsimile camera acording to claim 3 wherein said means for dividing the light from said scanning means is a three-faced mirror.

5. An automatic focus control for a facsimile camera according to claim 1 including means for producing electrical signals indicative of predicted locations of said focal plane as said facsimile camera scans a flat terrain and a second movable stage means receiving said electrical signals indicative of predicted locations of said focal plane for moving said imaging detector so that it will remain in said predicted locations of said focal plane as said facsimile camera scans said terrain.

6. An automatic focus control for a facsimile camera according to claim 5 wherein said camera is located a distance L above said terrain and said means for moving said imaging detector includes means for moving said imaging detector proportional to $f \sin \theta / L/f - \sin \theta$ where $\theta$ is the instantaneous angle that the scanning means makes with said terrain and $f$ is the focal length of said lens.

* * * * *